US011254599B2

(12) United States Patent
Sokoloff et al.

(10) Patent No.: US 11,254,599 B2
(45) Date of Patent: Feb. 22, 2022

(54) METHOD FOR PRODUCING ROCK WOOL AND RECOVERABLE CAST IRON

(71) Applicants: ECO'RING, Feurs (FR); EURECAT S.A., La Voulte-sur-Rhone (FR)

(72) Inventors: Bruno Sokoloff, Lyons (FR); Lyonel Picard, Feurs (FR)

(73) Assignees: ECO'RING, Chambéon (FR); EURECAT S.A., La Voulte-sur-Rhone (FR)

( * ) Notice: Subject to any disclaimer, the term of this patent is extended or adjusted under 35 U.S.C. 154(b) by 174 days.

(21) Appl. No.: 15/774,573

(22) PCT Filed: Nov. 4, 2016

(86) PCT No.: PCT/EP2016/076630
§ 371 (c)(1),
(2) Date: May 8, 2018

(87) PCT Pub. No.: WO2017/080913
PCT Pub. Date: May 18, 2017

(65) Prior Publication Data
US 2018/0319692 A1   Nov. 8, 2018

(30) Foreign Application Priority Data

Nov. 9, 2015 (FR) ..................... 1560700

(51) Int. Cl.
*C03B 5/00* (2006.01)
*C21B 3/06* (2006.01)
(Continued)

(52) U.S. Cl.
CPC .............. *C03B 5/005* (2013.01); *B09B 3/005* (2013.01); *B09B 5/00* (2013.01); *C03B 37/055* (2013.01);
(Continued)

(58) Field of Classification Search
CPC ........... C03B 5/005; B09B 5/00; B09B 3/005; C22B 7/04; C21B 3/06; C21B 11/02;
(Continued)

(56) References Cited

U.S. PATENT DOCUMENTS 4,409,190 A * 10/1983 Van Leirsburg ...... C22B 23/005
423/150.2
4,969,940 A * 11/1990 Schwarb ................. C03B 5/005
373/27
(Continued)

FOREIGN PATENT DOCUMENTS

| CA | 2435261 C | 11/2009 |
| WO | 9614454 A2 | 5/1996 |

(Continued)

OTHER PUBLICATIONS

International Search Report for PCT/EP2016/076630 dated Jan. 13, 2017.

*Primary Examiner* — Queenie S Dehghan
(74) *Attorney, Agent, or Firm* — Hahn Loeser & Parks LLP; Bret A. Hrivnak

(57) ABSTRACT

The invention relates to a method for producing rock wool and cast iron by melting a mixture of materials such as basalt, blast-furnace slag, coke and components necessary for melting, with an admixture containing alumina, said admixture making it possible to adjust the alumina content in order to obtain a rock wool having the following composition (as wt %): Al2O3: 18-22; SiO2: 40-50; CaO: 10-15; MgO: <10; FeO: <2; Na2O: <4; K2O: <2. The method includes the following operations: producing by melting a slag and a cast iron, separating the slag and the cast iron, and performing a fibring operation on the slag followed by a bonding operation in order to obtain the rock wool. According to the invention, at least one spent adsorbent and/or catalyst is used as an admixture, said catalyst containing (Continued)

Figure 1:
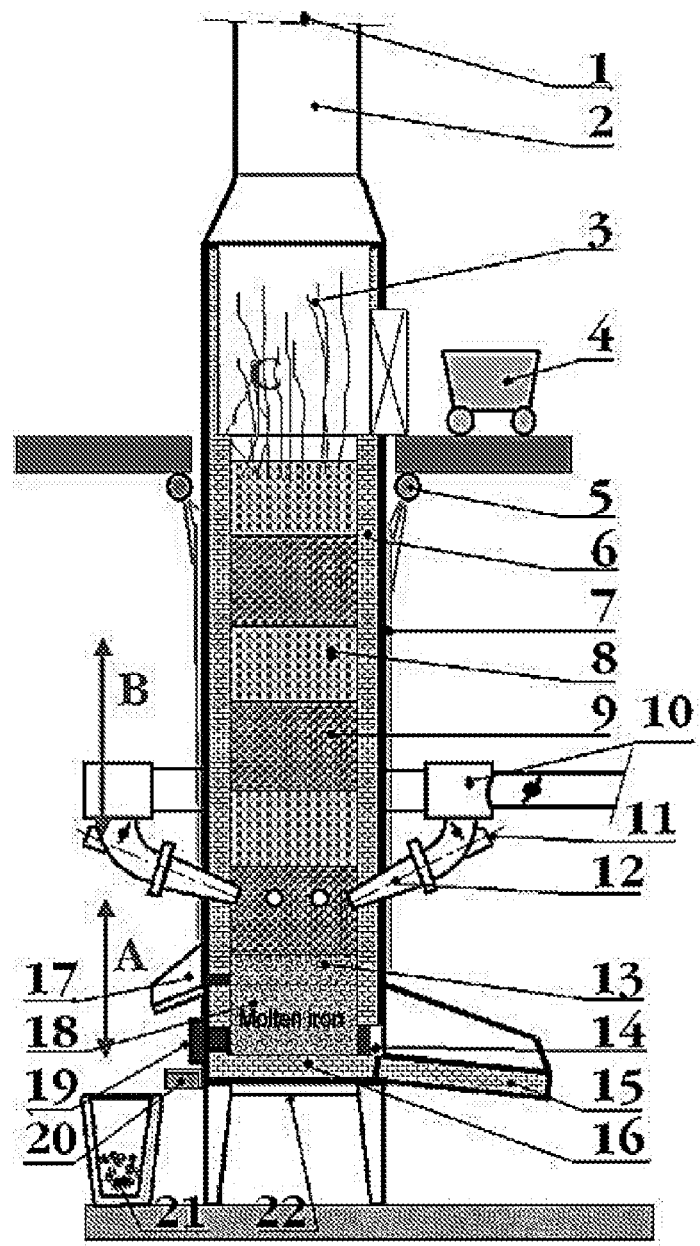

alumina in Al2O3 form. Said adsorbent and/or catalyst preferably contains at least one metal, and said metal is retrieved in the cast iron.

13 Claims, 2 Drawing Sheets

(51) Int. Cl.
  C22B 7/04 (2006.01)
  C03B 37/05 (2006.01)
  C03C 13/06 (2006.01)
  C03C 1/00 (2006.01)
  C03C 3/087 (2006.01)
  B09B 3/00 (2006.01)
  B09B 5/00 (2006.01)
  C21B 11/02 (2006.01)
  C21C 1/08 (2006.01)
(52) U.S. Cl.
  CPC ............ *C03C 1/002* (2013.01); *C03C 3/087* (2013.01); *C03C 13/06* (2013.01); *C21B 3/06* (2013.01); *C22B 7/04* (2013.01); *C03C 2213/00* (2013.01); *C21B 11/02* (2013.01); *C21C 1/08* (2013.01); *Y02P 10/20* (2015.11); *Y02P 40/50* (2015.11); *Y02W 30/50* (2015.05)
(58) Field of Classification Search
  CPC ......... C03C 3/087; C03C 13/06; C03C 1/002; Y02P 40/52; Y02P 10/212; Y02W 30/543; C21C 1/08
  See application file for complete search history.

(56) References Cited

U.S. PATENT DOCUMENTS

| | | | |
|---|---|---|---|
| 5,198,190 A | 3/1993 | Phillip et al. | |
| 5,496,392 A * | 3/1996 | Sims | C03B 3/02 423/DIG. 18 |
| 5,912,916 A * | 6/1999 | Hendrix | H05B 7/107 373/94 |
| 7,704,902 B2 | 4/2010 | Maquin et al. | |
| 2004/0177650 A1 | 9/2004 | Noack | |
| 2004/0235650 A1* | 11/2004 | Saleh | B01J 37/0232 502/258 |
| 2006/0042319 A1* | 3/2006 | Nykiel | C03B 1/02 65/134.8 |
| 2006/0162391 A1* | 7/2006 | Hansen | C03B 1/02 65/482 |
| 2007/0209968 A1* | 9/2007 | Euzen | B01J 21/12 208/108 |
| 2012/0132032 A1* | 5/2012 | Domke | C22B 1/14 75/10.67 |
| 2015/0290920 A1* | 10/2015 | Braden | B32B 37/146 156/210 |
| 2016/0168445 A1* | 6/2016 | Pandey | C04B 28/04 166/294 |
| 2017/0029669 A1* | 2/2017 | Obert | D04H 1/4209 |

FOREIGN PATENT DOCUMENTS

| | | |
|---|---|---|
| WO | 9730002 A1 | 8/1997 |
| WO | 9845215 A2 | 10/1998 |
| WO | 9928252 A1 | 6/1999 |
| WO | 02057194 A1 | 7/2002 |
| WO | 2006103376 A2 | 10/2006 |

* cited by examiner

METHOD FOR PRODUCING ROCK WOOL AND RECOVERABLE CAST IRON

The invention relates to a method for producing rock wool and cast iron by melting a mixture of materials with an admixture containing alumina to obtain rock wool having the standard composition such that (in wt %): $Al_2O_3$: 18-22; $SiO_2$: 40-50; CaO: 10-15; MgO: <10; FeO<2; $Na_2O$<4; $K_2O$<2, of the type comprising the operations of producing slag and cast iron by melting, separating the slag and the cast iron and subjecting the slag to a fiber forming operation and then bonding to obtain rock wool.

Methods of this type for producing rock wool are already known. Thus, manufacture of rock wool from raw materials such as basalt and blast-furnace slag is known.

Fluxes and coke are added to these starting materials in order to melt the mixture in a reactor such as a cupola or an electric furnace.

After separating the cast iron, the slag is formed into fiber, in a manner known per se, by projecting onto rotors at high speed. Then bonding products are added, as well as elements specific to each use, and then the fiber mat thus obtained is polymerized, calendered and packaged.

The methods of manufacture of rock wool have the primary aim of producing slags, with production of cast iron as a secondary aim. The latter results from reduction of the iron contained as impurity in the charge materials. The typical operating temperature of a rock-melting cupola or of an electric furnace is of the order of 1450° C. to 1550° C.

The raw materials of mineral charge are mainly basalt or blast-furnace slag of the following composition:

| Basalt type (wt %) | Blast-furnace slag type (wt %) |
|---|---|
| $SiO_2$: 40-55 | 35-40 |
| $Al_2O_3$: 12-17 | 8-12 |
| $Fe_2O_3$: 8-12 | 0.2-0.8 |
| MgO: 4-6 | 7-10 |
| CaO: 5-8 | 38-42 |
| $Na_2O$: 2-4 | 0-0.5 |
| $K_2O$: 2-3 | 0-0.5 |
| $TiO_2$: 1.5-3 | 0.8-1.2 |
| $P_2O_5$: 0.4-0.5 | 0-0.5 |

They are ground and sized before being loaded into the furnace and mixed with the additions, i.e. any additive known by a person skilled in the art for obtaining good melting and a good melt.

Foundry coke is also added. The coke supplies the energy necessary for operation of the rock-melting cupola and to supplement the electric furnace, and it reduces certain metal oxides such as iron oxide. In a cupola, it is for example deposited in separate layers.

So that the rock wool is of a light yellow color and the chemical composition of the wool corresponds to the standard indicated above, it has been found to be necessary to correct the mineral base charge in units of alumina $Al_2O_3$. Moreover, the units of iron contained in the mineral base charge must be extracted to comply with this standard chemical composition and preserve the specified light yellow color.

Adjustment of the alumina content is achieved conventionally by adding bauxite, which is an inexpensive material, with the following typical chemical composition, depending on the species of karst bauxite or lateritic bauxite:

Alumina in the form of aluminum hydroxide: 48-60%
$SiO_2$: 1 to 7%
$Fe_2O_3$: 2 to 23%
$TiO_2$: 2 to 4%
CaO: 0 to 4%
$H_2O$ (of constitution): 10 to 30%

Now, bauxite consists of aluminum hydroxide, with a content of water of constitution from 10 to 30%. As the dehydration that is then required is very endothermic, bauxite melting is very energy-consuming.

Moreover, bauxite supplies units of Fe that must be extracted by reduction smelting in the form of cast iron. This extraction is performed using coke, the traditional reducing element for iron oxide in the iron and steel industry. Typically, reduction of the units of iron contained either in the mineral charges, notably basalt and blast-furnace slag, or in bauxite, produces a small amount of phosphoric iron, with the following chemical composition:

| Fe | 92-95% |
|---|---|
| C | 1.5 to 4% |
| Si | 2.5 to 3.5% |
| P | 0.5 to 4% |
| S | 0.1 to 0.5% |
| Mn | 0.05 to 0.2% |
| Cr | 0.02 to 0.2% |
| Ti | 0.02 to 0.2% |
| Al | 0.01 to 0.1% |

This cast iron is of very low economic value and is a problem for the operator who must deal with it. Most often it goes to landfill.

Regarding coke, some of this serves to produce the latent heat of transformation of the water of constitution of the bauxite.

Furthermore, it has been found that adding aluminum-containing material of the corundum type may result in persistence of particles of unmelted materials in the liquid phase, or wall incrustation, leading to problems downstream of the process such as beads or small blocks that have not melted, which are particularly undesirable for fiber production.

The invention aims to overcome the drawbacks of the methods of the prior art.

To achieve this aim, the method according to the invention is mainly characterized in that for adjusting the alumina content it uses catalysts containing alumina in the form of $Al_2O_3$ that is porous and particularly fusible.

More precisely, the invention relates to a method for producing rock wool and cast iron by melting a mixture of materials such as basalt, blast-furnace slag, coke and components necessary for melting, with an admixture containing alumina, said admixture making it possible to adjust the alumina content to obtain rock wool having the following composition (in wt %): $Al_2O_3$: 18-22; $SiO_2$: 40-50; CaO: 10-15; MgO: <10; FeO<2; $Na_2O$<4; $K_2O$<2, said method being of the type comprising the operations of producing slag and cast iron by melting, separating the slag and the cast iron and subjecting the slag to a fiber forming operation and then bonding to obtain rock wool, characterized in that the admixture used is at least one spent catalyst and/or at least one spent adsorbent, said catalyst and/or adsorbent containing alumina in the form of $Al_2O_3$.

Said catalyst and/or adsorbent often contains at least one metal, said metal being recovered in the cast iron.

The admixture comprises one or more catalysts and/or adsorbents. The admixture generally comprises said catalyst and/or adsorbent as well as bauxite, preferably the admixture consists of bauxite and of said catalyst and/or adsorbent. The admixture may consist of said catalyst and/or adsorbent.

Generally, the catalyst and/or adsorbent contains at least one metal selected from the group consisting of groups VIB, VIIIB and VB of the Periodic Table. Preferably, the catalyst and/or adsorbent contains Ni and/or Co and/or Mo and/or W and/or V. Preferably, the catalyst and/or adsorbent also contains phosphorus.

Preferably, the catalyst has:
a density between 0.5 and 1, and/or
a total pore volume between 0.2 and 0.9 ml/g, generally between 0.2 and 0.8 ml/g or 0.3 and 0.7 ml/g and most often between 0.3 and 0.6 ml/g and/or
a BET surface area between 20 and 400 $m^2/g$ and most often between 100 and 300 $m^2/g$.

Preferably, the adsorbent has:
a density between 0.5 and 1, and/or
a total pore volume between 0.2 and 0.9 ml/g and most often between 0.3 and 0.7 ml/g and/or
a BET surface area between 20 and 800 $m^2/g$, preferably between 20 and 400 $m^2/g$ and most often between 100 and 400 $m^2/g$.

Advantageously, a catalyst and/or adsorbent is used having an S content from 2 to 5 wt %. Preferably, before being charged in the method, the catalyst and/or adsorbent is optionally submitted to a step of roasting so as to reduce its S content to at most 5 wt %.

Melting takes place between 1250° C. and 1600° C., preferably 1400° C.-1500° C.

This method produces rock wool and cast iron by melting in a single step.

THE METHOD DESCRIBED IN THE FIGURES

Figure 2:
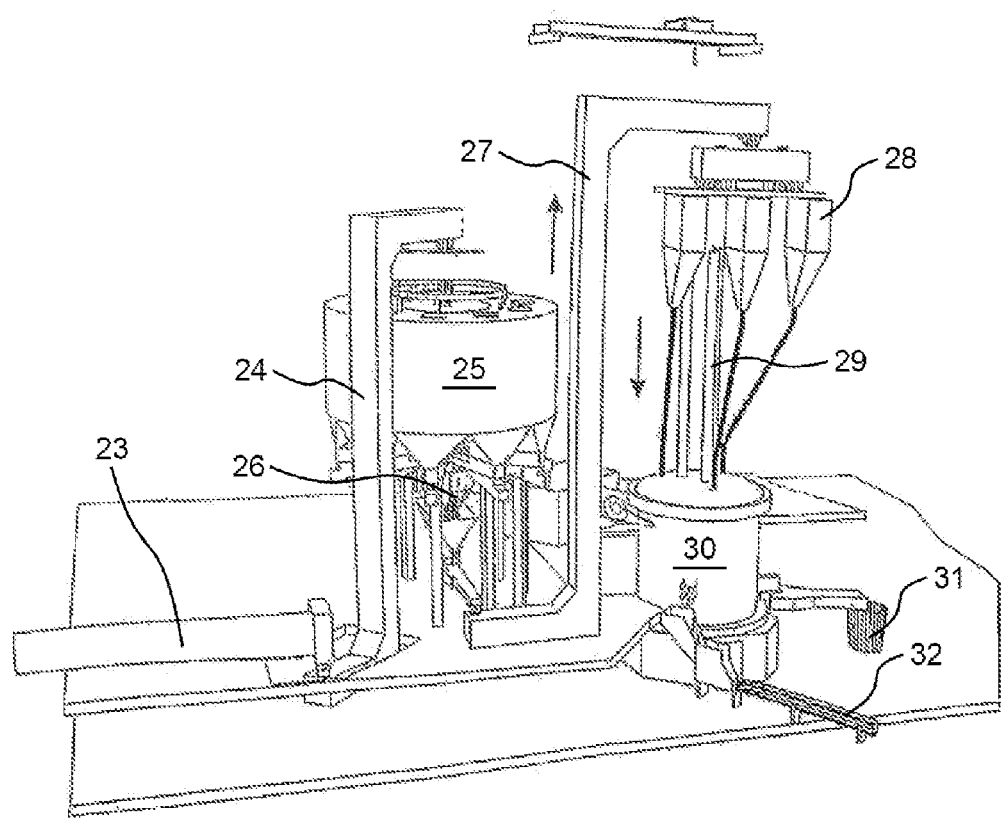

The description of the invention will be better understood by referring to the figures, and other aims, features, details and advantages thereof will become clearer in the explanatory description given hereunder, referring to the appended schematic drawings, given purely as an example illustrating just one embodiment of the invention, in which:

FIG. 1 is a schematic view illustrating the method of making rock wool and cast iron according to the invention, using a rock wool cupola, and FIG. 2 is a schematic view of a melting furnace usable in the method according to the invention, namely a submerged-arc furnace.

The invention relates to a method for producing rock wool and cast iron by melting in a melting furnace such as a rock-melting cupola or a submerged-arc furnace.

The particular feature of the invention is that the additions of alumina of the bauxite type or of some other type are replaced partly or completely with the alumina contained in spent catalysts. This alumina in the form of $Al_2O_3$ possesses high porosity and fusibility.

As shown schematically in FIG. 1, production of rock wool comprises, successively, the step of producing slag and cast iron by melting in a rock-melting cupola 1, the step of separating the slag and the cast iron which contains most of the metals, the step in which the slag is submitted to a fiber forming operation and the step of bonding to obtain rock wool. The last two operations are known per se and so need not be described.

Regarding the cupola shown in FIG. 1, the charges are introduced in the throat. The slag and the cast iron, in the liquid state, are withdrawn from the cupola.

In FIG. 1, showing a foundry cupola, the following elements denote:

1: Dedusting system
2: Chimney
3: Throat (part via which the ore and the coke+limestone flux are charged).
4: Charging system (with tubs for small cupolas and skips for large installations)
5: Water spraying (systems for spraying the whole of the exterior of the cupola with water. The water flows along the shaft, cooling it and preventing it melting under the effect of the internal heat, especially in case of degradation of the refractory lining)
6: Packing (generally of compressed earth brick based on refractory material and assembled by ramming)
7: Shaft of the cupola (often made of thick tungsten sheet)
8: Metallic charges
9: Charges (coke+limestone flux).
10: Wind box (supplies air to the tuyeres)
11: Peephole, notably for monitoring melting
12: Tuyeres (inject air to activate coke combustion)
13: Slag (layer that forms on the surface of the bath of molten iron)
14: Tap hole (opened when pouring the iron into the holding furnace)
15: Launder (placed above the holding furnace)
16: Bed plate (bottom refractory part of the cupola)
17: Slag hole (for removing the slag before tapping the iron)
18: Well (filled with iron and incandescent coke)
19: Lighting hole
20: Water recovery spout
21: Dross tank (for recovery of slag and dross)
22: Drop bottom (intended for cleaning the cooled cupola, before repairing the refractory lining).

FIG. 2 illustrates the method for producing slag and cast iron using a submerged-arc furnace as the melting furnace. In this figure, references 28, 29 and 30 denote the charging hoppers, the electrodes and the electric melting furnace, respectively. The iron is tapped at 31 and the slag for making rock wool is discharged at 32.

The following elements denote:
23: system for feed/charging of the materials
24 and 27: elevators
25: storage hopper
26: mixer The Spent Catalysts and/or Adsorbents The method applies to any type of spent catalysts and/or adsorbents whose mineral support is porous and contains alumina. Most often, they contain at least one metal.

"Spent catalysts and/or adsorbents" means catalysts and/or adsorbents that their owners no longer wish to use and that are destined for destruction. For a catalyst, the reason may be degradation of their quality, essentially at the level of their catalytic activity and their mechanical properties. This may relate to catalysts that have become contaminated with undesirable elements during use. Their end of life is also often due to loss of mechanical strength or inadequate size. For adsorbents, the reason may be degradation of their quality, essentially at the level of their capacity for adsorption and their mechanical properties.

The invention applies to catalysts and/or adsorbents, and preferably to catalysts.

A wide range of catalysts and/or adsorbents may be used in the method according to the invention. The catalyst comprises a porous support containing alumina in the form of $Al_2O_3$ and at least one metallic element of the Periodic Table. The metallic element is preferably selected from groups VB, VIB, VIIIB, and preferably the metal is selected from Ni and/or Co and/or Mo and/or W and/or V.

The amount of catalyst and/or adsorbent as admixture may be modified depending on the composition of the catalyst and/or adsorbent, and the presence and the content of certain metallic or nonmetallic elements in the catalyst and/or adsorbent.

They are generally hydrotreating (HDT) catalysts or catalytic cracking (FCC, Fluid Catalytic Cracking) catalysts. The catalysts for hydrotreating (HDT, also called HPC for Hydroprocessing) in particular comprise catalysts for hydrodesulfurization (HDS), hydrodenitrogenation (HDN), and hydrocracking. They may also be, non-exhaustively, catalysts for hydrogenation, selective hydrogenation or total hydrogenation. It is also possible to use FCC (fluid catalytic cracking) catalysts, catalysts of the hydrogen chain, catalysts of the Claus chain for converting $H_2S$ to elemental S that are of the alumina type (often consisting of alumina) or titanium oxide, or else Fischer-Tropsch catalysts based on Co.

The HDT catalysts contain alumina and constituent elements such as Ni, Co, Mo, W, P, B and as contaminating elements, in the case of spent catalysts, V, Ni, Fe, As, Na, Si, P, Ca. The FCC catalysts contain alumina and aluminosilicates.

They may also be hydrogenation catalysts based on Co or Ni and Mo and an alumina support, catalysts for selective hydrogenation or total hydrogenation based on nickel (5 to 50 wt % Ni and an alumina support).

The hydrocracking catalysts based on Ni and W supported on alumina and amorphous or crystalline silica-alumina (zeolite) are also suitable.

We may also mention catalytic cracking (FCC) catalysts based on alumina, silica-alumina and zeolite, or else catalysts of the hydrogen chain based on Ni, Fe, Cr, Cu, Zn, or else catalysts of the Claus chain of the alumina or titanium oxide type, or else Fischer-Tropsch catalysts based on Co.

This is not an exhaustive list.

The adsorbents are used in various applications for purification of streams or for molecular separation. As an example, we may mention drying of various streams, of air, or of hydrocarbon-containing cuts or of other gas mixtures. It may be a question of absorbing impurities other than water, for example hydrocarbons in trace amounts or other mineral elements, such as chlorine, etc. Adsorbents are also employed for feed purification in a certain number of applications, for example purification of olefins, production of polyolefins, and production of hydrogen peroxide.

Activated alumina is also used in water purification processes, for adsorbing undesirable minerals and nutrients, such as arsenic, fluoride, copper, zinc, lead, silica, phosphates and nitrates.

The alumina content (in the form of $Al_2O_3$) in the catalysts and/or adsorbents is from 20 to 100 wt %, most often from 40 to 100 wt %. If the catalyst and/or adsorbent contains a metallic phase, or other compounds, the content above 100% is decreased by that much; the upper limit may be 95%.

For the hydrotreating catalysts, it is generally from 60 to 90% and for the FCC catalysts it is generally between 45 and 80%.

The catalyst and/or adsorbent contains alumina; in addition to alumina, it may contain silica (silica-alumina), a zeolite (e.g. an aluminosilicate such as zeolite Y) or any other support usually employed in catalysts and/or adsorbents (and notably those mentioned above) known by a person skilled in the art.

The alumina mineral phase of the catalysts and/or adsorbents is a porous solid.

The catalyst has a total pore volume typically between 0.2 and 0.8 ml/g and most often between 0.3 and 0.6 ml/g. This pore volume is for example 0.5 ml/g.

This pore volume generally corresponds to a pore size between 5 and 100 nm, most often between 7 and 50 nm.

Another characteristic feature of these porous catalysts and/or adsorbents is their relatively low density, precisely because of this extensive porous network. This apparent density is measured dry (after calcination at 550° C., 2 h), it is often between 0.5 and 1, and most often between 0.6 and 0.9. In the presence of coke, hydrocarbons or metallic contaminants, this density may exceed 1 but without reaching the high density of bauxite or materials of the same type (density of at least 2.3). It may be up to 1.5 or 1.8.

It should be noted that it is considered here that the density corresponds to the density in g/liter.

The catalysts and/or adsorbents generally contain less water than bauxite does; their water content is generally below 5 wt % and most often below 1 wt %.

The catalysts and/or adsorbents may be in the form of beads, tablets, extrudates, briquettes, powders, fragments, sands. It will be preferable to proceed with agglomeration and geometric calibration so as to be able to charge them in the melting furnace for producing rock wool.

The metals, and notably Ni, Co, Mo, W, V belong to the category of so-called strategic metals for which it is of critical importance to reinforce the routes for reuse and recycling.

The cast iron obtained according to the invention is marketable as it contains strategic metals. The latter may be extracted from the melt by the same reduction process as for iron oxide contained in bauxite, as will be explained hereunder.

The case of catalysts and/or adsorbents containing sulfur or phosphorus will also be described below.

The Method According to the Invention

As stated above, the invention consists of replacing, with porous and fusible catalysts and/or adsorbents, some or all of the inputs of alumina $Al_2O_3$ necessary for obtaining the standard chemical composition of rock wool traditionally made from bauxite.

A major advantage of the invention is that it produces simultaneously, in a single pyrometallurgical step, metallic cast iron containing the metallic elements Ni, Co, Mo, W, V contained in the catalysts, and a slag that can be converted to rock wool.

This pyrometallurgical step may advantageously be preceded by a step of roasting the catalyst and/or adsorbent allowing the removal of a substantial fraction of the carbon and sulfur contained in the catalysts and/or adsorbents.

The Effect of Sulfur

Nevertheless, it was found that the percentage of residual sulfur contained in the roasted catalysts and/or adsorbents could be far higher, at a level from 3 to 4 wt %, than that traditionally specified in the pyrometallurgical chain for recycling spent catalysts, namely below 2%.

From the thermodynamic standpoint, and at the operating melting point of the rock-melting cupolas, i.e. 1450° C.-1550° C., the carbothermal reduction, i.e. with coke, of the metal oxides (such as those of Ni, Co, Mo, W and V) contained in the catalysts and/or adsorbents is entirely similar to that of the iron oxides, or even better; the units of these metals (such as Ni, Co, Mo, W and V) will end up in the cast iron.

The Effect of Phosphorus

Moreover, doping of catalysts and/or adsorbents with phosphorus constitutes an advantage as the latter is well known as being an excellent flux in melting processes.

Finally, the units of phosphorus in the catalysts and/or adsorbents are incrusted in the pores, thus contributing to excellent fusibility of the alumina in the catalysts.

Typically, the cast iron produced by adding catalysts, partially or completely replacing the addition of bauxite, has the following chemical composition:

| | |
|---|---|
| Mo | 10 to 45% |
| Ni | 0 to 15% |
| Co | 0 to 15% |
| W | 0 to 20% |
| V | 0 to 25% |
| C | 1.5 to 4% |
| P | 3 to 8% |
| S | 0.5 to 3% |
| Si | 2.5 to 3.5% |
| Mn | 0.05 to 0.2% |
| Cr | 0.02 to 0.2% |
| Ti | 0.02 to 0.2% |
| Al | 0.01 to 0.1% |
| Balance: Iron | | with a very low melting point of the order of 1250 to 1350° C., making it easier to pour and lowering the energy consumption of the rock-melting cupola.

The cast iron produced is then refined in the sense of dephosphorization to allow marketing of the metals contained in foundries and steelworks in a conventional steel-making process of the arc furnace and/or converter type. The iron ingots are charged in the arc furnace and/or converter to be treated by a conventional dephosphorization process of the oxidizing type (process for dephosphorization of iron in iron and steelmaking after production in the blast furnace).

Owing to the presence of the element P, phosphorus, the slag and the cast iron will have a lower melting point. This unexpected advantage results in particular from the high content of phosphorus in certain catalysts, at a level for example from 1 to 5 wt %. Phosphorus is a doping element in certain catalysts, for example hydrotreating catalysts, and/or optionally a contaminant derived from petroleum feedstock.

As a result, the viscosity of the slag and of the cast iron will be lower, their respective pouring is facilitated, and the energy consumption is also lowered relative to the conventional process of the rock-melting cupola or electric furnace.

Another consequence is that, depending on the composition of the catalyst and/or adsorbent, the operating temperature of the cupola or electric furnace can be lowered.

Other Advantages of the Invention

Addition of porous alumina-based catalyst and/or adsorbent leads to an unexpected technical advantage, which consists of greatly simplified and more economical operation of the pyrometallurgical method.

Improved Melting

In fact, with additions of aluminum-containing material of the bauxite or corundum type, sometimes difficulties are observed in melting, leading to persistence of particles of unmelted material in the liquid phase or incrustation on the walls, which causes problems downstream of the method for producing rock wool in terms of quality and production rejects.

However, with the porous alumina contained in catalysts and/or adsorbents, the fusibility is very high. It is possible that this unexpected effect is due to the high porosity of this material, and/or to the presence of flux of the phosphorus type actually within the alumina material. Thus, it has very good fusibility and solubility in the molten mineral fraction.

Thus, a replacement raw material of far better quality than the traditional charges is available to the operator.

This characteristic of high fusibility corresponds to a high melting rate, thus shortening the residence time in the hot zone and increasing productivity, compared to the conventional method with bauxite. It also makes it possible to reduce the operating problems of slag incrustation on the walls.

Moreover, it has been found that the presence of molybdenum and/or tungsten accelerates the decanting of the metallic phase (cast iron) owing to the high density of molybdenum and/or tungsten, compared to iron in the case of bauxite. This phenomenon contributes to reduction of the residence time.

Thus, owing to the presence of easily fusible porous catalyst and/or adsorbent as a replacement for bauxite, it is possible to operate the furnace for producing rock wool at lower temperatures than the conventional method. Generally the temperature is between 1350° C. and 1500° C. It is thus possible to make substantial savings of energy and improvements of productivity.

Moreover, the absence of charging with water when using catalysts compared to bauxite—since the catalysts and/or adsorbents generally contain less water than bauxite does (water content below 5 wt %, most often below 1 wt %)—makes it possible to make substantial savings, owing to absence of the endothermic effect of water evaporation.

A Marketable Cast Iron

The yields of recovery, in the cast iron, of the metals contained in the catalysts and/or adsorbents are excellent, typically above 90% or 95% and even above 98% for example for Ni, Co, W and Mo.

This also arises from two concomitant effects inherent in the technology of the cupola or electric furnace in the production of rock wool. On the one hand the charges in the upper parts of the furnace or cupola are preheated by the hot gases of the cupola or electric furnace with a high level of carbon monoxide. Starting from 750° C., carbon monoxide acts as a solid-phase reducing agent for metals, which is thus called solid-phase prereduction. We thus have a gas/solid reaction, so-called solid-phase prereduction. This is a well-known phenomenon for producing iron sponge starting from ores, which is employed advantageously in the context of the invention.

Finally, when the charges arrive in the pasty melting zone, the metals are reduced immediately and completely (such as those of groups VIII and VIB, such as Fe, Ni, Co, Mo, etc.). Then they percolate in the form of metallic nodules, which coalesce and quickly settle to the bottom of the furnace. It should also be noted that the losses of metals by entrainment are very slight in a furnace for producing rock wool.

The conventional method for making rock wool in a rock-melting cupola or electric furnace produces a small amount of low-value secondary material, namely cast iron based on iron with a low phosphorus content, whereas the method according to the invention still produces only a small amount of cast iron, but which is highly marketable, while producing a large amount of rock wool but with smaller additions of coke connected with evaporation of water from the bauxite.

Another possible advantage of the invention is a decrease in the amount of iron in the melt since less bauxite (with high iron content) is used.

A Facilitated Method

Finally, the operator can recover the slag poured with the phosphoric iron owing to trough casting, allowing separation, by density difference in the liquid phase, the cast iron at the bottom of the trough, and the slag as supernatant; on solidification, the cast iron and the slag separate naturally.

Conventionally, as the aim is to obtain slag that is not mixed with cast iron, according to the prior art the cast iron was discharged (for landfill) with a small amount of slag entrained during gravity casting. Thus, for an output of rock wool of 50 kT/year, there was loss of 2500 T of slag during casting of phosphoric iron through landfill.

With the invention, the aim is to obtain a marketable cast iron as well. Trough casting, intended for good recovery of the cast iron, makes it possible, by densimetric separation of the metal-slag phases, to recover this lost fraction of slag and recycle it to the rock-melting cupola, thereby saving an equal amount of raw materials.

A Method that is Improved Relative to Those of the Prior Art

The invention offers major advantages relative to the conventional route for pyrometallurgical recycling of catalysts.

Firstly, the recovery rate is significantly improved relative to the conventional pyrometallurgical methods.

Moreover, the invention utilizes the alumina contained in catalysts and/or adsorbents in an ideal way, since rock wool needs alumina, whereas it is utilized very poorly or not at all in the conventional pyrometallurgical methods for recycling catalysts. Therefore two highly marketable products are obtained in a single step, in rather energetically favorable operating conditions.

Compared to the hydrometallurgical recycling route (consisting of leaching of the metals Mo, W, V by alkaline leaching), recycling of catalysts and/or adsorbents according to the invention in the context of the production of rock wool and cast iron offers some other advantages.

In fact, operation is without addition of dangerous or toxic leaching agent, without any labor cost, without capital expenditure for leaching (tank, mixing, storage of toxic products, pipework, pumps, filter press and instrumentation), without liquid waste and without co-products that are difficult to remove.

Moreover, the elements Ni and Co are utilized, which is not or seldom the case in the conventional methods as these metals are not extracted in the hydrometallurgical route. The solid fraction resulting from alkaline leaching, rich in alumina, Ni and Co, may optionally be used in pyrometallurgy for recovery of Ni and Co. However, owing to the low contents, the economics of this melting is not often favorable.

A Considerable Economic Advantage

In addition to the technical advantages, there are considerable economic advantages when the operator of the rock-melting cupola or electric furnace replaces new raw material with less expensive alumina catalysts.

The cost of alumina in the form of bauxite is of the order of 70 to 150 €/T. As an example, if the operator needs to correct 10% of $Al_2O_3$, he will use 20% of bauxite at 50% alumina contained in the charge. If the bauxite costs 100 €/T then for 50 kT/year of production of rock wool and as the alumina of the catalysts may be considered to be without value in the marketplace, the saving could be 1 M€ for 5 kT of $Al_2O_3$ substituted.

Moreover, with the invention, the phosphoric iron is now marketable owing to the metals that it contains, saving the cost of landfill, from 10 to 15 €/T, which for an output of 50 kT/year of wool and 2500 T of cast iron represents a saving of 25 to 37.5 k€/year.

The saving on the charge of raw materials can be evaluated at 10-15 €/T (costs of extraction and grinding-crushing of quarry rock and/or blast-furnace slag), plus its correction in $Al_2O_3$ for example of 10% that it already contains and with bauxite at 100 €/T which represents 20 €/T or a saving of the order of 75 to 87.5 k€/year.

With the invention, the operator reduces the consumption of coke in the cupola and of electricity in the submerged-arc furnace for dehydration of bauxite, the saving represents from 3 to 16% of the coke consumption in the cupola and from 2 to 10% of the electricity consumption of the submerged-arc furnace. For an output of 50 kT/year of rock wool and 3750 T of recycled catalysts, the saving is of the order of 200 to 250 k€/year.

The overall gain for the operator in production of rock wool may be of the order of 1000 k€/year for an output of 50 kT/year of rock wool and 3750 T/year of recycled catalysts.

Another advantage is that the method has lower energy consumption. In fact, the chemical and physical nature of the alumina of the catalysts plays a role. It is in fact an oxide, anhydrous or with a low level of hydration, whereas bauxite consists of aluminum hydroxide $Al(OH)_3$, with a content of water of constitution from 10 to 28 wt %. As dehydration is highly endothermic, melting of alumina catalysts consumes much less energy than melting of bauxite, on the one hand because of their very low water content, and on the other hand owing to their porosity compared to that of the blocks of bauxite rock.

Environmental Advantages

Furthermore, the invention is perfectly positioned in the context of sustainable development and the circular economy associated with optimum utilization of waste in existing tools, being economical of natural resources, and reducing the tonnages of waste going to landfill.

The operator in production of rock wool finds several environmental advantages according to the invention.

He uses a smaller amount of natural raw material of the bauxite type. He finds a solution for recycling and utilization of certain of his production waste, namely cast iron and the associated slag. He recycles external waste, thus improving his environmental balance. He reduces his energy consumption with a lower melting point, while improving the productivity and reliability of his production, in particular by eliminating unmelted products.

Compared to conventional pyrometallurgy for recycling catalysts, the amount of charge used is much lower: coke, lime, ferrosilicon, magnesia, iron ores. Savings are also made on the furnace electrodes, on the refractory materials for the furnaces, and on energy consumption. Moreover, it avoids toxic reagents, water consumption, aqueous effluents containing traces of metals, as well as solid wastes.

As is already clear from the foregoing, the method according to the invention offers numerous technical, economic and environmental advantages.

Better Recycling of the Metals in Spent Catalysts and/or Adsorbents

Regarding the recycling of catalysts (for example HDT catalysts), the invention utilizes the minerals contained in the catalysts ideally and directly (in the charge as such). In the same process step, the metals (for example Ni, Co, Mo, W, V) contained in the catalysts and/or adsorbents are recovered in the cast iron produced with a recovery rate that is significantly improved by several % relative to the current pyrometallurgical routes for recycling these same catalysts.

Relative to the "pyrometallurgical" recycling route, the invention has a major advantage as it is direct, without addition of specific charge materials (coke, iron ores, ferro-silicon, lime, magnesia, electrical energy, etc.), without labor costs, without capital expenditure for melting and without having to upgrade and transport slags for recycling by the rock wool route or in the cement works.

Relative to the "hydrometallurgical" recycling route, the invention has a major advantage as it is direct, without addition of toxic leaching agent, without labor costs, without capital expenditure for leaching (tank, mixing, storage of toxic products, pipework, pumps, filter press and instrumentation), without liquid waste and without an insoluble co-product that has to be removed. Moreover, the units of Ni and Co are upgraded, these metals not being extracted in the hydrometallurgical route.

The overall gain for the catalyst recycler may be of the order of 2300 k€/year for an output of 50 kT/year of rock wool and 3750 T/year of recycled catalysts.

These spent catalysts and/or adsorbents constitute admixtures of better quality than those of the prior art for the production of rock wool.

The mineral phase contained in the catalysts is of high porosity. Thus, it has very good fusibility and solubility in the molten mineral fraction. This is to be compared with the alumina of the bauxite or corundum type, which is notoriously difficult to melt, with the risk of unmelted products causing either problems in the cupola, or production rejects such as unmelted beads in the rock wool.

The operator thus has a replacement raw material of better quality than that of the traditional charges. He finds the same level of ferrous metals to be extracted with the catalysts as with bauxite or the like. Up to now, operators of rock-melting cupolas have utilized little if any of the phosphoric iron that they produce. Thus, via the invention they find an exemplary utilization route.

To summarize, the invention consists of replacing a raw material, namely bauxite, containing alumina in the form of aluminum hydroxide $Al(OH)_3$, therefore containing water of constitution at a typical level from 10 to 30%, with catalysts and/or adsorbents containing a mineral phase rich in alumina, preferably in the form of dry alumina (as defined above) and porous, and for certain catalysts containing a powerful flux such as phosphorus.

Since the alumina content of the catalysts and/or adsorbents is greater than that of bauxite, for identical alumina correction in rock wool, less charge material will be used, which also offers advantages from the standpoint of transport, storage, transfer, volume and productivity. Moreover, since the catalysts and/or adsorbents contain less water than bauxite does, less coke is required for melting in the case of catalysts. In fact, in the methods of the prior art based on the use of bauxite, a proportion of the coke serves for evaporating the water contained in the bauxite.

More precisely, regarding the amount of catalyst and/or adsorbent to be used, it should be noted that the alumina content (in the form of aluminum hydroxide) in bauxite is from 48 to 60%, whereas the alumina content (in the form $Al_2O_3$) in hydrotreating catalysts is from 60 to 90% and in catalysts of the FCC type it is between 45% and 80%. Consequently, on replacing bauxite with catalysts, and for the same quantity of alumina required for production of rock wool, the amount in kg of catalysts charged will be lower than for bauxite. In general, typically for HDS catalysts, the charge of material will be from 10 to 50% less, and for FCC catalysts the charge of material will be from 1 to 25% less, for identical alumina correction with a charge of the bauxite type.

Regarding the amounts of coke, for a common coke consumption from 120 to 200 kg/tonne of slag, the decrease in coke consumption using catalysts rather than bauxite for identical alumina correction varies between 3% and 16% when a rock wool cupola is used as the melting furnace. In the case of a submerged-arc furnace, for a common electrical energy consumption from 800 to 1200 kW/h per tonne of slag, the decrease in energy consumption using catalysts rather than bauxite for identical alumina correction varies from 2% to 10%.

Another essential feature of the invention is that it uses spent catalysts, i.e. wastes that should ideally be recycled. Now, certain catalysts are currently recycled and others go to landfill. The invention makes it possible to recycle many more catalysts in a much wider range of chemical composition than in the state of the art.

The invention claimed is:

1. A method for producing simultaneously, using a single pyrometallurgical step, cast iron and slag that is then converted into rock wool by melting a mixture of materials such as basalt, blast-furnace slag, coke and components necessary for melting, with an admixture containing alumina, said admixture making it possible to adjust the alumina content to obtain rock wool, the method comprising the operations of producing slag and cast iron by melting, separating the slag and the cast iron and subjecting the slag to a fiber forming operation and then bonding to obtain rock wool having the following composition (in wt %): Al2O3: 18-22; SiO2: 40-50; CaO: 10-15; MgO: <10; FeO<2; Na2O<4; K2O<2, characterized in that at least one spent catalyst and/or at least one spent adsorbent is used as admixture, said catalyst and/or adsorbent containing: alumina in the form of Al2O3; one or more metallic elements selected from the group consisting of Ni, Co, Mo, W and V; and, phosphorus, and recovering cast iron containing said one or more metallic elements selected from the group consisting of Ni, Co, Mo, W and V, and having the following chemical composition (in wt %):

| | | |
|---|---|---|
| Mo | 10 to 45%, | |
| Ni | 0 to 15%, | |
| Co | 0 to 15%, | |
| W | 0 to 20%, | |
| V | 0 to 25%, | |
| C | 1.5 to 4%, | |
| P | 3 to 8%, | |
| S | 0.5 to 3%, | |
| Si | 2.5 to 3.5%, | |
| Mn | 0.05 to 0.2%, | |
| Cr | 0.02 to 0.2%, | |
| Ti | 0.02 to 0.2%, | |
| Al | 0.01 to 0.1%, | and |
| Balance: Iron. | | |

2. The method of claim 1, characterized in that the density of the catalyst and/or of the adsorbent is between 0.5 and 1 g/liter.

3. The method of claim 1, characterized in that the catalyst and/or adsorbent has a total pore volume between 0.2 and 0.9 ml/g.

4. The method of claim 3, wherein the catalyst and/or adsorbent has a total pore volume between 0.3 and 0.7 ml/g.

5. The method of claim 1, characterized in that the BET surface area of the catalyst is between 20 and 400 m2/g, and the BET surface area of the adsorbent is between 20 and 800 m2/g.

6. The method of claim 5, wherein the BET surface area of the catalyst is between 100 and 300 $m^2/g$, and the BET surface area of the adsorbent is between 100 and 400 $m^2/g$.

7. The method of claim 1, characterized in that melting takes place between 1250° C. and 1600° C.

8. The method of claim 7, wherein melting takes place between 1400° C. to 1500° C.

9. The method of claim 1, characterized in that a catalyst is used having a sulfur content from 2 to 5 wt %.

10. The method of claim 1, characterized in that, before being charged in the method, said catalyst and/or adsorbent is submitted to a step of roasting so as to reduce its sulfur content to at most 5 wt %.

11. The method of claim 1, characterized in that the admixture comprises said catalyst and/or adsorbent as well as bauxite.

12. The method of claim 1, characterized in that the admixture consists of bauxite and of said catalyst and/or adsorbent.

13. The method of claim 1, characterized in that the admixture consists of said catalyst and/or adsorbent.

* * * * *